(12) United States Patent
Stopa

(10) Patent No.: US 10,470,430 B2
(45) Date of Patent: Nov. 12, 2019

(54) COOLING SYSTEM FOR COOLING A FLOW OF MILK, MILK STORAGE FACILITY, MILKING SYSTEM, AND METHOD FOR RECONFIGURING A COOLING SYSTEM

(71) Applicant: DELAVAL HOLDING AB, Tumba (SE)

(72) Inventor: Jerzy Stopa, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 450 days.

(21) Appl. No.: 15/502,890

(22) PCT Filed: Aug. 7, 2015

(86) PCT No.: PCT/SE2015/050856
§ 371 (c)(1),
(2) Date: Feb. 9, 2017

(87) PCT Pub. No.: WO2016/024905
PCT Pub. Date: Feb. 18, 2016

(65) Prior Publication Data
US 2017/0231188 A1 Aug. 17, 2017

(30) Foreign Application Priority Data
Aug. 11, 2014 (SE) ....................... 1450932

(51) Int. Cl.
*A01J 9/00* (2006.01)
*A01J 9/04* (2006.01)
(Continued)

(52) U.S. Cl.
CPC ................ *A01J 9/04* (2013.01); *F28D 15/00* (2013.01); *F28F 27/02* (2013.01)

(58) Field of Classification Search
CPC ..................................... A01J 9/00; A01J 9/04
See application file for complete search history.

(56) References Cited

U.S. PATENT DOCUMENTS

2013/0269367 A1* 10/2013 Meillan .................... A01J 9/04
62/3.1

FOREIGN PATENT DOCUMENTS

DE 29715127 U1 * 12/1997 ................ A01J 9/04
DE 297 15 127 U1 2/1998
(Continued)

OTHER PUBLICATIONS

International-Type Search Report, dated Mar. 10, 2015, from corresponding PCT application.
(Continued)

*Primary Examiner* — Monica L Williams
*Assistant Examiner* — Aaron M Rodziwicz
(74) *Attorney, Agent, or Firm* — Young & Thompson

(57) ABSTRACT

A cooling system for cooling a flow of milk includes a first and a second refrigeration system; a first and a second intermediate coolant circulating system; and a line manifold interconnectable between the first and second intermediate coolant circulating systems, wherein coolant in the first intermediate coolant circulating system is in heat exchange connection with the first refrigeration system in a first heat exchange section and coolant in the second intermediate coolant circulating system is in heat exchange connection with the second refrigeration system in a second heat exchange section. The cooling system is reconfigurable between first operation configuration providing two-stage cooling of the flow of milk and a second operation configuration providing one-stage cooling of the flow of milk.

20 Claims, 4 Drawing Sheets

(51) Int. Cl.
*F28F 27/02* (2006.01)
*F28D 15/00* (2006.01)

(56) References Cited

FOREIGN PATENT DOCUMENTS

| | | | |
|---|---|---|---|
| EP | 0859545 A1 * | 8/1998 | ................ A01J 9/04 |
| EP | 0 859 545 B1 | 10/2000 | |
| EP | 1 251 732 B1 | 10/2004 | |
| EP | 1 370 131 B1 | 6/2006 | |
| RU | 2 206 215 C1 | 6/2013 | |
| WO | 2009/030860 A2 | 3/2009 | |
| WO | 2012/091672 A1 | 7/2012 | |
| WO | 2012/113092 A1 | 8/2012 | |
| WO | 2013/095292 A1 | 6/2013 | |

OTHER PUBLICATIONS

International Search Report, dated Nov. 2, 2015, from corresponding PCT application.

* cited by examiner

COOLING SYSTEM FOR COOLING A FLOW OF MILK, MILK STORAGE FACILITY, MILKING SYSTEM, AND METHOD FOR RECONFIGURING A COOLING SYSTEM

TECHNICAL FIELD

The technical field relates generally to cooling systems and methods for reconfiguring cooling systems. The systems and methods may be used in connection with milk storage facilities and/or milking systems.

RELATED ART

In dairy farming animals are milked and their milk is stored in a milk storage tank for collection on a regular time basis, e.g. every second day. In order to maintain the quality of the milk, and to minimize the bacterial growth and contents of free fatty acids (FFA) in the milk, it is cooled to temperatures to about 4° C. as quickly as possible. It is necessary to be careful during cooling of the milk because freezing of milk will have a detrimental effect on the milk quality.

Apparatuses based on heat exchangers to cool the milk on its way to the milk storage tank are known in the art.

EP 0859545 B1 discloses one such apparatus for cooling a product comprising a first evaporator and a second evaporator separate from the first evaporator, a first heat exchanger incorporating the first evaporator and a second heat exchanger incorporating the second evaporator. In operation, the product or an intermediate heat transfer medium is cooled in at least two stages. During the first stage, heat is withdrawn from the product or the medium by the first evaporator cooling the product or the medium to an intermediate temperature. During the second stage, heat is withdrawn from the product or the medium by the second evaporator further cooling the product or the medium to the desired temperature. Since the product or the medium is partially cooled by an evaporator operating at a higher evaporating temperature than required for achieving the desired temperature, improved energy efficiency is achieved.

The two evaporators of the apparatus disclosed in EP 0859545 B1 can work with different evaporation temperatures; the first evaporator can be used to cool milk partially and the second evaporator can be used to cool the milk further, down to a required storage temperature. While the apparatus, as a result, is energy efficient, there may be conditions, during which the apparatus is less suitable. User needs and dairy farm designs may further limit the application of the apparatus.

SUMMARY

It is an aim to reveal novel cooling systems and methods for reconfiguring cooling systems, by which the limitations of the prior art can be overcome.

It is a particular aim to reveal cooling systems, which are not only energy efficient but also flexible and versatile, and which can meet a great variety of user needs, and which can be used in a great variety of dairy farm designs and conditions.

A first aspect refers to a cooling system for cooling a flow of milk comprising a first refrigeration system and a second refrigeration system having individually controllable cooling powers, a first intermediate coolant circulating system and a second intermediate coolant circulating system, and a line manifold comprising one or more lines interconnectable between the first and second intermediate coolant circulating systems.

Coolant in the first intermediate coolant circulating system is in heat exchange connection with the first refrigeration system in a first heat exchange section and coolant in the second intermediate coolant circulating system is in heat exchange connection with the second refrigeration system in a second heat exchange section.

The cooling system is reconfigurable between a first and a second operation configuration.

In the first operation configuration, coolant in the first intermediate coolant circulating system is in heat exchange connection with a flow of milk to be cooled in a third heat exchange section and coolant in the second intermediate coolant circulating system is in heat exchange connection with the flow of milk to be cooled in a fourth heat exchange section arranged downstream of the third heat exchange section with respect to the milk flow. Coolants of the first and second intermediate coolant circulating systems are kept separated, thereby providing two-stage cooling of the flow of milk.

In the second operation configuration, the line manifold is interconnected between the first and second intermediate coolant circulating systems to mix coolant of the first intermediate coolant circulating system with coolant of the second intermediate coolant circulating system, such that the mixed coolants of the first and second intermediate coolant circulating systems are in heat exchange connection with the milk to be cooled in the third and fourth heat exchange sections or only in the fourth heat exchange section, thereby providing one-stage cooling of the flow of milk.

In the alternative where mixed coolants of the first and second intermediate coolant circulating systems are flown through the third and fourth heat exchange sections, the line manifold may comprise a bypass line connected such that the mixed coolants of the first and second intermediate coolant circulating systems are in heat exchange connection with the milk to be cooled in the fourth heat exchange section, are passed through the bypass line, and are therafter in heat exchange connection with the milk to be cooled first in the third heat exchange section. That is, the third and forth heat exchange sections are, at one end of the first and second intermediate coolant circulating systems, serially connected.

In the alternative where mixed coolants of the first and second intermediate coolant circulating systems are flown only through the fourth heat exchange section, the line manifold may be connected such that the mixed coolants of the first and second intermediate coolant circulating systems are in heat exchange connection with the milk to be cooled only in the fourth heat exchange section, thereby allowing the flow of milk to be pre-cooled by tap water in the third heat exchange section.

The cooling system is flexible and versatile and can meet a great variety of user needs and can be used in a great variety of dairy farm designs and conditions. When operated in the first operation configuration, the cooling system is highly energy efficient and when operated in the second operation configuration, the cooling system can be run as a single stage cooling system e.g. together with a separate pre-cooling arrangement.

The two-stage cooling system may be implemented in a one body coherent design with a common control system and common power connections, while being configurable between one-stage and two-stage cooling.

When two-stage cooling is requested, the second intermediate coolant circulating system of the cooling system may be reconfigured to operate in the first operation configuration enabling two-stage cooling, and when full power one-stage cooling is requested, the first and second intermediate coolant circulating systems of the cooling system may be reconfigured to operate in the second operation configuration enabling one-stage cooling. In the first operation configuration, the benefits of high efficiency multi stage cooling is obtainable, whereas in the second operation configuration, the benefits of full power one-stage cooling is obtainable.

In one embodiment, the first intermediate coolant circulating system comprises a pump for pumping coolant in the first intermediate coolant circulating system in the first operation configuration, and the second intermediate coolant circulating system comprises a pump for pumping coolant in the second intermediate coolant circulating system in the first operation configuration. In the second operation configuration, only one of the pumps is preferably operative to pump coolant at a time.

More in detail, the first intermediate coolant circulating system may comprise a supply line interconnected between the first and third heat exchange sections to allow coolant to be passed, in the first operation configuration, from the first heat exchange section to the third heat exchange section and a return line interconnected between the first and third heat exchange sections to allow coolant to be passed, in the first operation configuration, from the third heat exchange section and back to the first heat exchange section, and the second intermediate coolant circulating system may comprise a supply line interconnected between the second and fourth heat exchange sections to allow coolant to be passed, in the first operation configuration, from the second heat exchange section to the fourth heat exchange section and a return line interconnected between the second and fourth heat exchange sections to allow coolant to be passed, in the first operation configuration, from the fourth heat exchange section and back to the second heat exchange section.

The line manifold may comprise an optional further supply line interconnectable between the supply lines of the first and second intermediate coolant circulating systems to allow coolant, in the second operation configuration, to flow between the supply lines of the first and second intermediate coolant circulating systems and a further return line interconnectable between the return lines of the first and second intermediate coolant circulating systems to allow coolant, in the second operation configuration, to flow between the return lines of the first and second intermediate coolant circulating systems.

In one embodiment, the first intermediate coolant circulating system comprises a coolant tank, from which the pump of the first intermediate coolant circulating system is configured to pump coolant in the first operation configuration, the second intermediate coolant circulating system comprises a coolant tank, from which the pump of the second intermediate coolant circulating system is configured to pump coolant in the first operation configuration, and the line manifold comprises a further line interconnectable between the coolant tanks of the first and second intermediate coolant circulating systems to allow coolant to flow between the coolant tanks of the first and second intermediate coolant circulating systems in the second operation configuration.

In another embodiment, the cooling system comprises a coolant tank, wherein the first intermediate coolant circulating system comprises a first partition of the coolant tank, from which the pump of the first intermediate coolant circulating system is configured to pump coolant in the first operation configuration, and the second intermediate coolant circulating system comprises a second partition of the coolant tank, from which the pump of the second intermediate coolant circulating system is configured to pump coolant in the first operation configuration.

Further, the coolant tank may comprise a removable wall, which separates the first and second partitions to prevent coolant from flowing between the first and second partitions of the coolant tank in the first operation configuration, and which is removed to allow coolant to flow between the first and second partitions of the coolant tank in the second operation configuration.

Yet further, the cooling system may comprise a control arrangement operatively connected to the removable wall and configured to control the removable wall to move when reconfiguring the cooling system.

In one embodiment, the first and second intermediate coolant circulating systems comprise fittings allowing the line manifold to be connected to, and disconnected from, the first and second intermediate coolant circulating systems when the cooling system is reconfigured.

This allows for a manual reconfiguration e.g. performed by an operator.

In an alternative embodiment, the line manifold is interconnected between the first and second intermediate coolant circulating systems by valves, allowing coolant to pass between the first and second intermediate coolant circulating systems by valves depending on the position of the valves.

The valves may be controllable valves and the cooling system may comprise a control arrangement operatively connected to the controllable valves and configured to control the controllable valves when the cooling system is reconfigured, thus allowing for entirely automatic reconfiguration.

The control arrangement, or other separate control arrangement, may be configured to control the cooling powers of the first and second refrigeration systems when the cooling system is reconfigured, in particular such that the cooling powers are similar when reconfiguring the cooling system to operate in the second operation configuration.

Hereby, an automatic reconfiguration is enabled, such that the operation configuration can be automatically effectuated to meet altered needs or conditions after initial setup and installation of the cooling system.

A second aspect refers a milk storage facility comprising a milk tank for storing milk, a milk line connected to the milk tank, a milk pump for pumping milk through the milk line and into the milk tank, and the cooling system of the first aspect, wherein the third and fourth heat exchange sections are connected in the milk line. The milk line may be connected to a milking system, optionally via a buffer reservoir and a milk supply line.

A third aspect refers to a milking system comprising a cooling system of the first aspect or a milk storage facility of the second aspect.

A fourth aspect refers to a method for reconfiguring a cooling system such as the one disclosed above with reference to the first aspect. The method comprises the step of reconfiguring the cooling system between the first and second operation configurations.

The method may encompass any method steps corresponding to features disclosed above with reference to the first aspect as well as those set out in the dependent method claims.

Further characteristics and advantages will be evident from the detailed description of embodiments given hereinafter, and the accompanying FIGS. 1-4, which are given by way of illustration only.

DETAILED DESCRIPTION OF EMBODIMENTS

Figure 1:
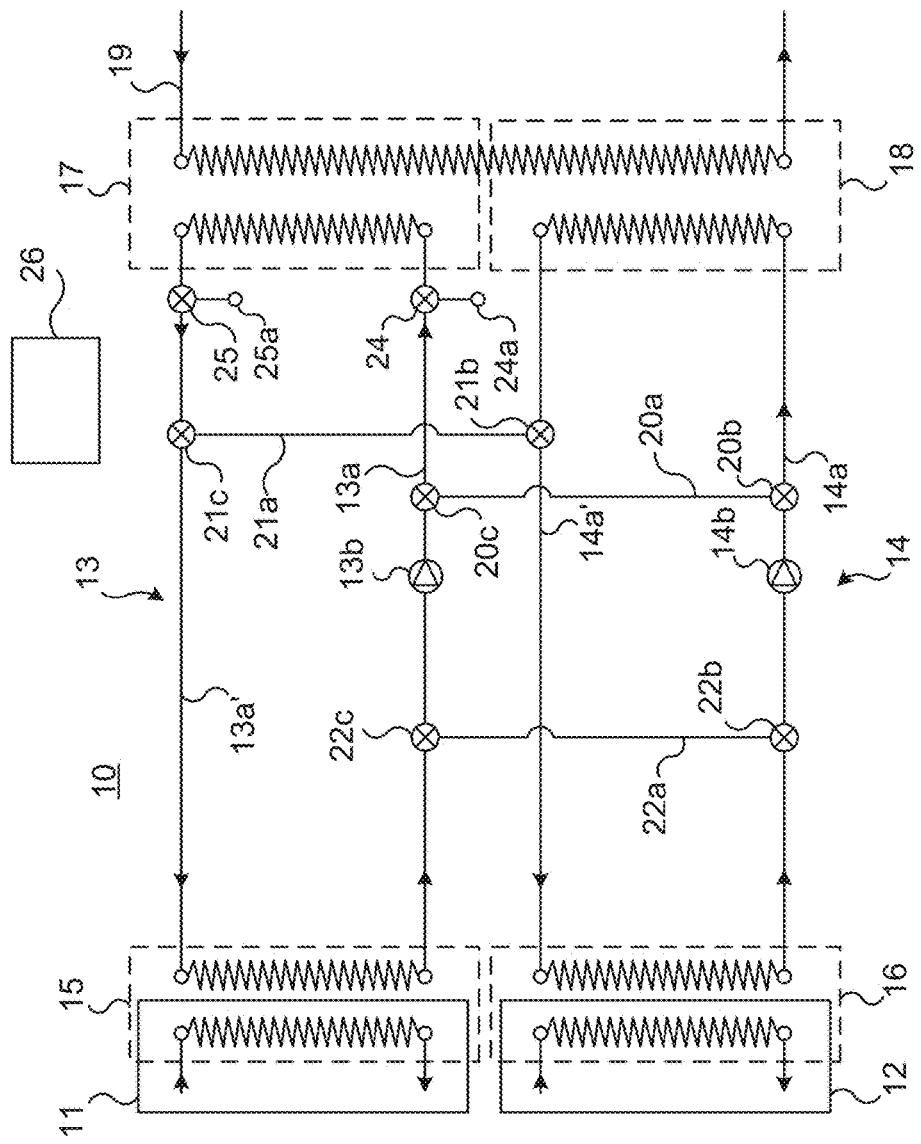
FIGS. 1-3 illustrate each, schematically, a cooling system for cooling a flow of milk according to a respective embodiment.

FIG. 1 illustrates, schematically, a cooling system 10 for cooling a flow of milk according to an embodiment. The cooling system 10 comprises a first refrigeration system 11 and a second refrigeration system 12 having individually controllable cooling powers, and a first intermediate coolant circulating system 13 and a second intermediate coolant circulating system 14. The cooling powers of the first 11 and second 12 refrigeration systems can thus be controlled independently of one another.

The coolant of the first intermediate coolant circulating system 13 may be in heat exchange connection with the first refrigeration system 11 in a first heat exchange section 15 and the coolant of the second intermediate coolant circulating system 14 may be in heat exchange connection with the second refrigeration system 12 in a second heat exchange section 16.

Further, the coolant of the first intermediate coolant circulating system 13 is in heat exchange connection with milk flown through a milk line 19 in a third heat exchange section 17, to thereby cool the milk. The coolant of the second intermediate coolant circulating system 14 is, in the first operation configuration, in heat exchange connection with the flow of milk to be cooled in a fourth heat exchange section 18 arranged downstream of the third heat exchange section 17 with respect to the milk flow.

The first 11 and second 12 refrigeration systems may each comprise an evaporator, a compressor connected with its suction side to the evaporator, a condenser connected to the high pressure side of the compressor, and an expansion valve interconnected between the condenser and the evaporator, thereby forming a closed circuit, in which a refrigerant can be circulated (not explicitly illustrated). Such refrigeration systems are disclosed in the above mentioned EP 0859545 B1 as well as in EP 1251732 B1 and EP 1370131 B1, the contents of which being hereby incorporated by reference. The evaporator of the respective refrigeration system 11, 12 is in heat exchange connection with the respective intermediate coolant circulating system 13, 14 in the respective heat exchange section 15, 16.

The first intermediate coolant circulating system 13 may comprise a supply line 13a interconnected between the first 15 and third 17 heat exchange sections to allow coolant to be passed from the first heat exchange section 15 to the third heat exchange section 17, a return line 13a' interconnected between the first 15 and third 17 heat exchange sections to allow coolant to be passed from the third heat exchange section 17 and back to the first heat exchange section 15, and a pump 13b for circulating coolant in the first intermediate coolant circulating system 13.

The second intermediate coolant circulating system 14 may comprise a supply line 14a interconnected between the second 16 and fourth 18 heat exchange sections to allow coolant to be passed from the second heat exchange section 16 to the fourth heat exchange section 18, a return line 14a' interconnected between the second 16 and fourth 18 heat exchange sections to allow coolant to be passed from the fourth heat exchange section 18 and back to the second heat exchange section 16, and a pump 14b for circulating coolant in the second intermediate coolant circulating system 14.

The coolants of the first and second intermediate coolant circulating systems 13, 14 may be for instance pure water, or water to which one or more additives, such as e.g. glycol, is/are added.

The cooling system 10 may comprise a control system 26 for the overall control of the operation of the cooling system 10.

The cooling system 10 may further comprise a line manifold interconnectable between the first 13 and second 14 intermediate coolant circulating systems. The line manifold may comprise a further supply line 20a interconnected between the supply lines 13a, 14a of the first 13 and second 14 intermediate coolant circulating systems, a further return line 21a interconnected between the return lines 13a', 14a' of the first 13 and second 14 intermediate coolant circulating systems, and/or a further line 22a connected between the supply lines 13a, 14a of the first 13 and second 14 intermediate coolant circulating systems upstream of the pumps 13, 14b.

Each of the further supply line 20a, the return line 21a, and the further line 22a may be connected to the respective lines of the first 13 and second 14 intermediate coolant circulating systems by means of three-way valves 20b-c, 21b-c, and 22b-c allowing coolant to pass between the first 13 and second 14 intermediate coolant circulating systems depending on the position of the valves 20b-c, 21b-c, and 22b-c. The valves 20b-c, 21b-c, and 22b-c may be controllable valves and the control arrangement 26, or other control arrangement, may be operatively connected to the valves 20b-c, 21b-c, and 22b-c and configured to control the valves 20b-c, 21b-c, and 22b-c.

The cooling system 10 is reconfigurable between a first and a second operation configuration.

In the first operation configuration, the coolant in the first intermediate coolant circulating system 13 is in heat exchange connection with a flow of milk to be cooled in the third heat exchange section 17 and the coolant in the second intermediate coolant circulating system 14 is in heat exchange connection with the flow of milk to be cooled in the fourth heat exchange section 18 arranged downstream of the third heat exchange section 17 with respect to the milk flow, thereby providing two-stage cooling of the flow of milk. In other word, the pump 13b circulates coolant in the first intermediate coolant circulating system 13 and the pump 14b circulates coolant in the second intermediate coolant circulating system 14. The valves 20b-c, 21b-c, and 22b-c are positioned appropriately.

In the second operation configuration, the line manifold is interconnected between the first 13 and second 14 intermediate coolant circulating systems to mix the coolant of the first intermediate coolant circulating system 13 with the coolant of the second intermediate coolant circulating system 14, such that the mixed coolants of the first and second intermediate coolant circulating systems are in heat exchange connection with the milk to be cooled in the third 17 and fourth 18 heat exchange section or only in the fourth heat exchange section 18, thereby providing one-stage cooling of the flow of milk.

In the second operation configuration, only one of the pumps 13b, 14b is advantageously operative to pump coolant at a time.

In a first variant of the second operation configuration, the line manifold is connected such that the mixed coolants of the first 13 and second 14 intermediate coolant circulating systems are in heat exchange connection with the milk to be cooled only in the fourth heat exchange section 18, thereby allowing the flow of milk to be pre-cooled by tap water in the third heat exchange section 17.

If the pump 13b of the first intermediate coolant circulating system 13 is to be used, the coolants are pumped in the following manner. The coolants are pumped through a portion of the supply line 13a of the first intermediate coolant circulating system 13, are diverted by the valve 20c into the further supply line 20a, are pumped through a portion of the supply line 14a of the second intermediate coolant circulating system 14, through the fourth heat exchange section 18, and through a portion of the return line 14a' of the second intermediate coolant circulating system 14. At the valve 21b, the coolants are divided up. One stream is led through the further return line 21a, through a portion of the return line 13a' of the first intermediate coolant circulating system 13, through the first heat exchange section 15, and into the supply line 13a of the first intermediate coolant circulating system 13. The other stream is led through the return line 14a' of the second intermediate coolant circulating system 14, through the second heat exchange section 16, through a portion of the supply line 14a of the second intermediate coolant circulating system 14, through the further line 22a, and into the supply line 13a of the first intermediate coolant circulating system 13, where it is mixed with the first stream. The valves 20b-c, 21b-c, and 22b-c are positioned appropriately.

If the pump 14b of the second intermediate coolant circulating system 14 is to be used, the coolants are pumped in the following manner. The coolants are pumped through a portion of the supply line 14a of the second intermediate coolant circulating system 14, through the fourth heat exchange section 18, and through a portion of the return line 14a' of the second intermediate coolant circulating system 14. At the valve 21b, the coolants are divided up. One stream is led through the further return line 21a, through a portion of the return line 13a' of the first intermediate coolant circulating system 13, through the first heat exchange section 15, through a portion of the supply line 13a of the first intermediate coolant circulating system 13, through the further line 22a, and into the supply line 14a of the second intermediate coolant circulating system 14. The other stream is led through the return line 14a' of the second intermediate coolant circulating system 14, through the second heat exchange section 16, and into the supply line ma of the second intermediate coolant circulating system 14, where it is mixed with the first stream downstream of the valve 22b. The valves 20b-c, 21b-c, and 22b-c are positioned appropriately.

It shall be appreciated that in the first variant of the second operation configuration, the flow of milk may be pre-cooled by tap water in the third heat exchange section 17. To this end, the first intermediate coolant circulating system 13 may comprise connection points 24a, 25a for connection to tap water, wherein the connection points 24a, 25a may be connected to valves 24, 25, e.g. automatically controllable valves, arranged in the supply 13a and return 13a' lines of the first intermediate coolant circulating system 13.

In a second variant of the second operation configuration, the line manifold comprises a bypass line (not illustrated) interconnectable between the return line 14a' of the second intermediate coolant circulating system 14 and the supply line 13a of the first intermediate coolant circulating system 13, and the line manifold is connected such that the mixed coolants of the first 13 and second 14 intermediate coolant circulating systems are in heat exchange connection with the milk to be cooled in the fourth heat exchange section 18, are passed through the bypass line, and are therafter in heat exchange connection with the milk to be cooled first in the third heat exchange section 17.

If the pump 13b of the first intermediate coolant circulating system 13 is to be used, the coolants are pumped in the following manner. The coolants are pumped through a portion of the supply line 13a of the first intermediate coolant circulating system 13, are diverted by the valve 20c into the further supply line 20a, are pumped through a portion of the supply line ma of the second intermediate coolant circulating system 14, through the fourth heat exchange section 18, through the bypass line, through the third heat exchange section 17, and into the return line 13a' of the first intermediate coolant circulating system 13. At the valve 21c, the coolants are divided up. One stream is led through the return line 13a' of the first intermediate coolant circulating system 13, through the first heat exchange section 15, and into the supply line 13a of the first intermediate coolant circulating system 13. The other stream is led through the further return line 21a, through a portion of the return line 14a' of the second intermediate coolant circulating system 14, through the second heat exchange section 16, through a portion of the supply line ma of the second intermediate coolant circulating system 14, through the further line 22a, and into the supply line 13a of the first intermediate coolant circulating system 13, where it is mixed with the first stream. The valves 20b-c, 21b-c, and 22b-c are positioned appropriately.

If the pump 14b of the second intermediate coolant circulating system 14 is to be used, the coolants are pumped in the following manner. The coolants are pumped through a portion of the supply line 14a of the second intermediate coolant circulating system 14, through the fourth heat exchange section 18, through the bypass line, through the third heat exchange section 17, and into the return line 13a' of the first intermediate coolant circulating system 13. At the valve 21c, the coolants are divided up. One stream is led through the return line 13a' of the first intermediate coolant circulating system 13, through the first heat exchange section 15, through a portion of the supply line 13a of the first intermediate coolant circulating system 13, through the further line 22a, and into the supply line ma of the second intermediate coolant circulating system 14. The other stream is led through the further return line 21a, through a portion of the return line 14a' of the second intermediate coolant circulating system 14, through the second heat exchange section 16, and into the supply line 14a of the second intermediate coolant circulating system 14, where it is mixed with the first stream downstream of the valve 22b. The valves 20b-c, 21b-c, and 22b-c are positioned appropriately.

The control arrangement 26 may be configured to control the cooling powers of the first 11 and second 12 refrigeration systems when the cooling system is reconfigured. In particular, the cooling powers of the first 11 and second 12 refrigeration systems ought to be similar when the cooling system is reconfigured into the second operation configuration. In the first operation configuration, the cooling powers of the first 11 and second 12 refrigeration systems may or may not be similar depending on the application, in which the cooling system 10 is to be used.

It shall be appreciated that the various valves of FIG. 1 may be dispensed with, and instead fittings may be provided allowing the line manifold to be connected to, and disconnected from, the first 13 and second 14 intermediate coolant circulating systems when the cooling system 10 is reconfigured.

Figure 2:
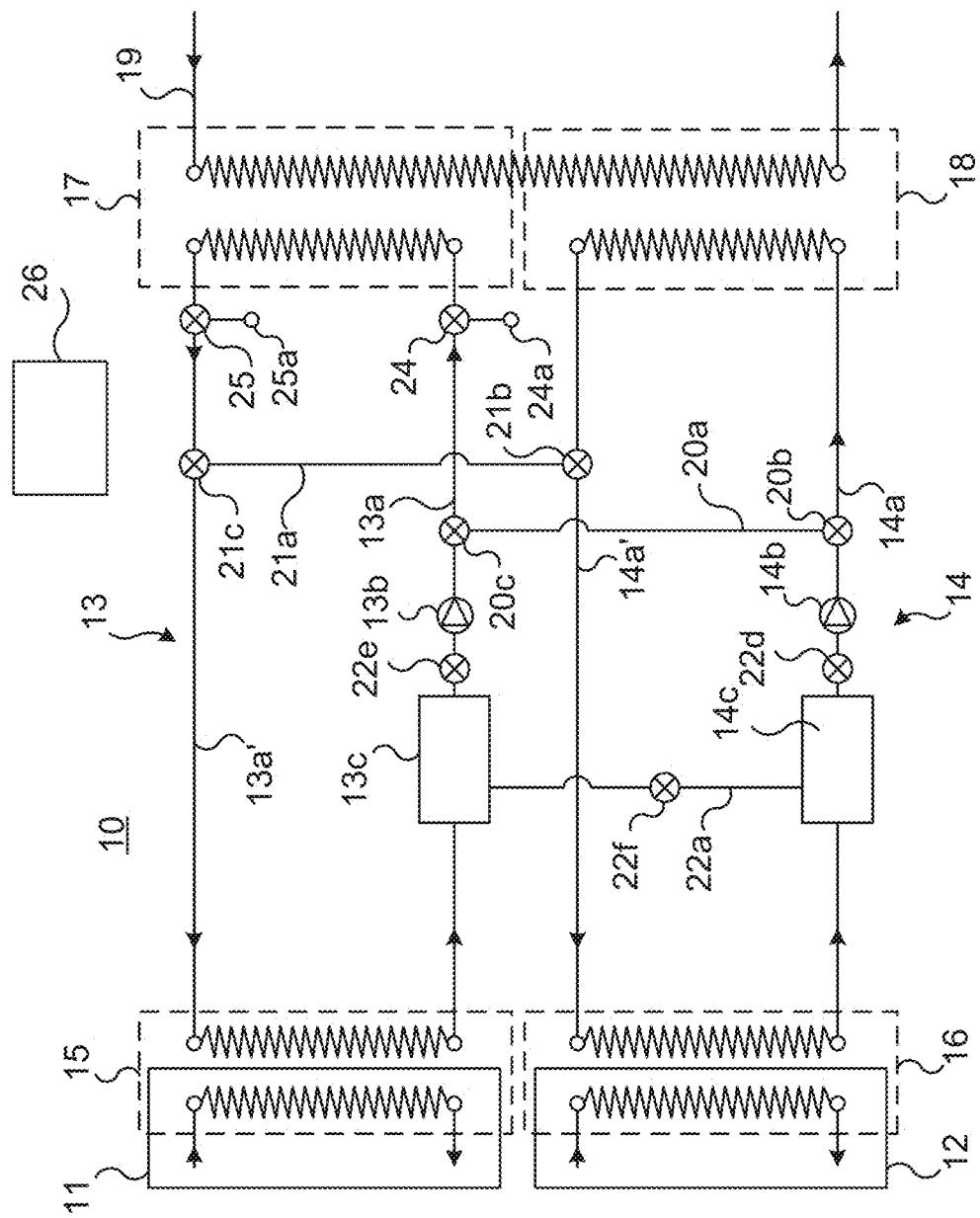

FIG. 2 illustrates, schematically, a cooling system for cooling a flow of milk according to an embodiment, which differs from the embodiment of FIG. 2 in that the valves 22*b*-*c* are exchanged for coolant tanks 13*c*, 14*c*, i.e. the coolant tank 13*c* is interconnected in the supply line 13*a*, the coolant tank 14*c* is interconnected in the supply line 14*a*, and the further line 22*a* is connected between the coolant tanks 13*c*, 14*c*. Further, three valves 22*d*-*f* are provided for switching on/off coolant flows in the supply lines 13*a*, 14*a* downstream of the coolant tanks 13*c*, 14*c* and in the further line 22*a*.

Figure 3:
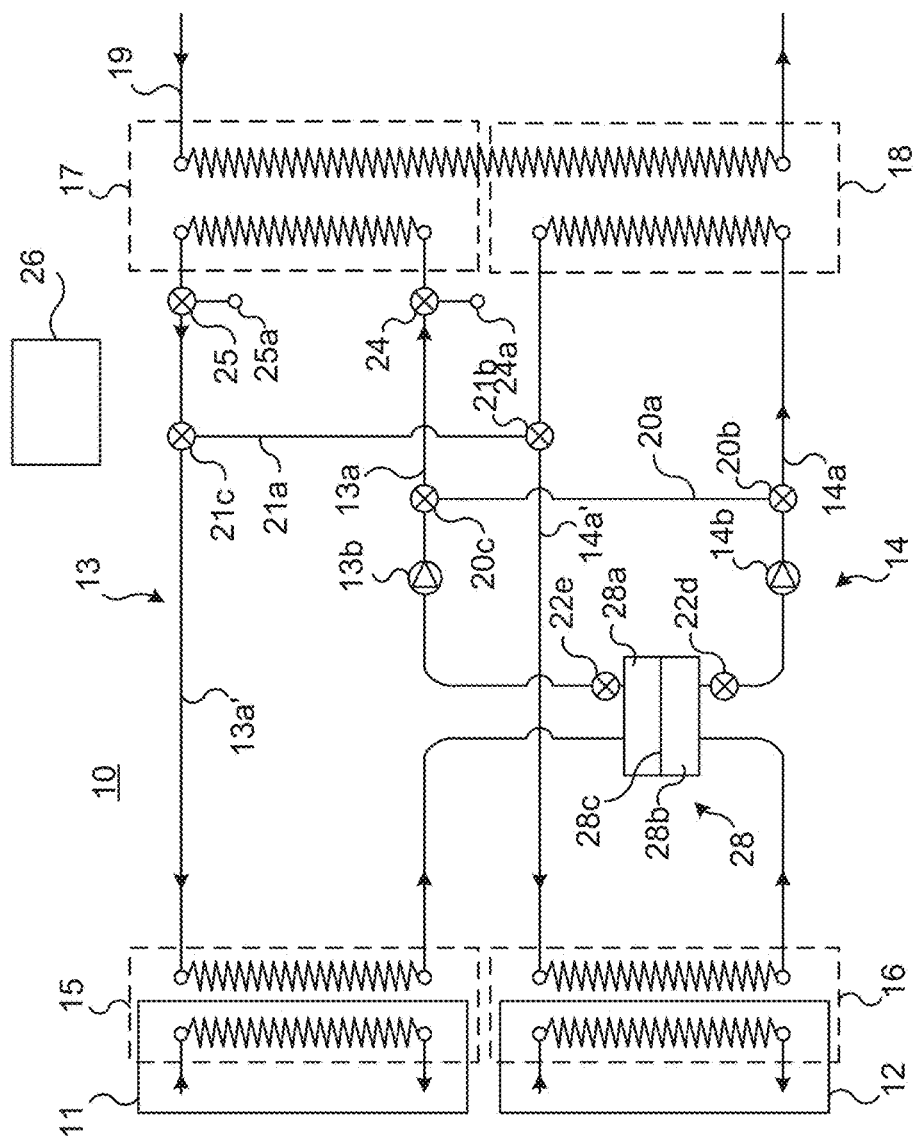

FIG. 3 illustrates, schematically, a cooling system for cooling a flow of milk according to an embodiment, which differs from the embodiment of FIG. 2 in that the coolant tanks 13*c*, 14*c* of the first 13 and second 14 intermediate coolant circulating systems, the line 22*a*, and the valve 22*f* are exchanged for a single coolant tank 28.

The first intermediate coolant circulating system 13 comprises a first partition 28*a* of the coolant tank 28, from which the pump 13*b* of the first intermediate coolant circulating system 13 is configured to pump coolant in the first operation configuration, and the second intermediate coolant circulating system 14 comprises a second partition 28*b* of the coolant tank 28, from which the pump 14*b* of the second intermediate coolant circulating system 14*b* is configured to pump coolant in the first operation configuration.

Further, the coolant tank 28 comprises a removable wall 28*c*, which separates the first 28*a* and second 28*b* partitions to prevent coolant from flowing between the first 28*a* and second 28*b* partitions of the coolant tank 28 in the first operation configuration, and which is removed to allow coolant to flow between the first 28*a* and second 28*b* partitions of the coolant tank 28 in the second operation configuration.

The removable wall 28*c* may be automatically movable, wherein the control system 26 (or other control arrangement) may be configured to control the removable wall 28*c* to move when reconfiguring the cooling system 10.

Figure 4:
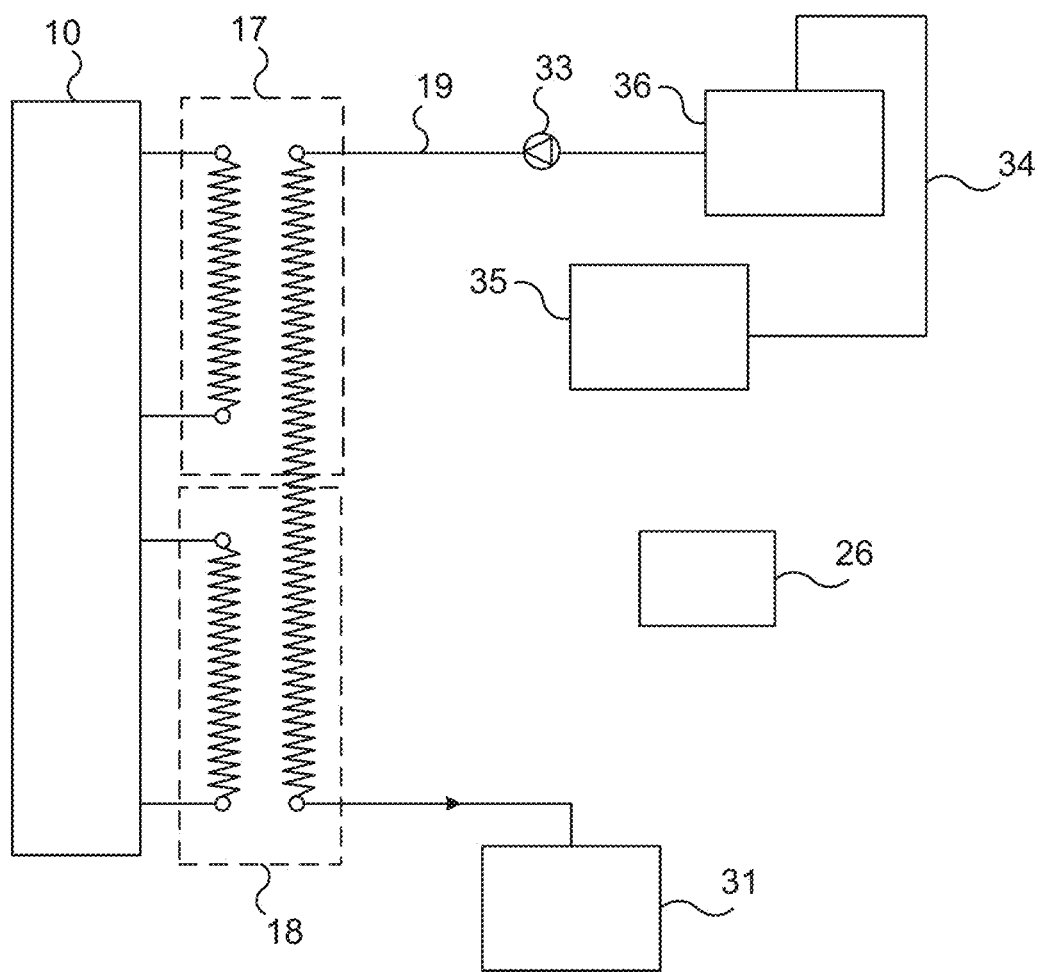
FIG. 4 illustrates, schematically, an embodiment of a milk storage facility connected to a milking system and comprising the cooling system of any of FIGS. 1-3.

FIG. 4 illustrates, schematically, an embodiment of a milk storage facility connected to a milking system 35 and comprising any of the cooling systems of FIGS. 1-3.

The milk storage facility comprises a milk tank 31 for storing milk, a milk line 19 connected to the milk tank, a milk pump 33 for pumping milk through the milk line 19 and into the milk tank 31, and a cooling system 10 as disclosed above, wherein the milk line 19 passes through the third 18 and fourth 19 heat exchange sections.

Further, the milk storage facility may optionally comprise a milk supply line 34 connectable to a milking system 35 and a buffer reservoir 36 into which the optional milk supply line 34 opens, wherein the milk line 19 is connected to the optional buffer reservoir 36 allowing the milk pump 33 to pump milk from the optional buffer reservoir 36, through the milk line 19, and into the milk tank 31. If the optional milk supply line 34 and the optional buffer reservoir 36 are dispensed with, the milk line 19 is connected directly to the milking system 35.

The present document refers also to a milking system comprising any of the cooling systems disclosed in FIGS. 1-3 or the milk storage facility disclosed in FIG. 4.

Yet further, the document refers to methods of reconfiguring a cooling system as disclosed above with reference to any of FIGS. 1-3. Such methods may be manually performed by an operator by means of operating the valves or connecting/disconnecting the line manifold by use of fittings. Alternatively, they may be automatically performed by means of automatically operating the switches.

The invention claimed is:

1. A cooling system (10) for cooling a flow of milk comprising:
   a first refrigeration system (11) and a second refrigeration system (12) having individually controllable cooling powers;
   a first heat exchange section (15), a second heat exchange section (16), a third heat exchange section (17), and a fourth heat exchange section (18);
   a first intermediate coolant circulating system (13) and a second intermediate coolant circulating system (14); and
   a line manifold interconnectable between the first and second intermediate coolant circulating systems, wherein,
   coolant in the first intermediate coolant circulating system (13) is in heat exchange connection with the first refrigeration system in the first heat exchange section (15) and coolant in the second intermediate coolant circulating system (14) is in heat exchange connection with the second refrigeration system in the second heat exchange section (16); and
   the cooling system is reconfigurable between
   (i) a first operation configuration wherein coolant in the first intermediate coolant circulating system is in heat exchange connection with a flow of milk to be cooled in the third heat exchange section (17) and coolant in the second intermediate coolant circulating system is in heat exchange connection with the flow of milk to be cooled in the fourth heat exchange section (18) arranged downstream of the third heat exchange section with respect to the milk flow, thereby providing two-stage cooling of the flow of milk, and
   (ii) a second operation configuration wherein the line manifold is interconnected between the first and second intermediate coolant circulating systems to mix coolant of the first intermediate coolant circulating system with coolant of the second intermediate coolant circulating system, such that the mixed coolants of the first and second intermediate coolant circulating systems are in heat exchange connection with the milk to be cooled in the third (17) and fourth (18) heat exchange section or only in the fourth heat exchange section (18), thereby providing one-stage cooling of the flow of milk.

2. The cooling system of claim 1, wherein,
   the first intermediate coolant circulating system comprises a first pump (13*b*) for pumping coolant in the first intermediate coolant circulating system in the first operation configuration; and
   the second intermediate coolant circulating system comprises a second pump (14*b*) for pumping coolant in the second intermediate coolant circulating system in the first operation configuration.

3. The cooling system of claim 2, wherein, in the second operation configuration, only one of the first and second pumps is operative to pump coolant at a time.

4. The cooling system of claim 2, wherein,
the first intermediate coolant circulating system comprises a supply line (13a) interconnected between the first and third heat exchange sections to allow coolant to be passed, in the first operation configuration, from the first heat exchange section to the third heat exchange section and a return line (13a') interconnected between the first and third heat exchange sections to allow coolant to be passed, in the first operation configuration, from the third heat exchange section and back to the first heat exchange section; and
the second intermediate coolant circulating system comprises a supply line (14a) interconnected between the second and fourth heat exchange sections to allow coolant to be passed, in the first operation configuration, from the second heat exchange section to the fourth heat exchange section and a return line (14a') interconnected between the second and fourth heat exchange sections to allow coolant to be passed, in the first operation configuration, from the fourth heat exchange section and back to the second heat exchange section.

5. The cooling system of claim 4, wherein the line manifold comprises a further supply line (20a) interconnectable between the supply lines of the first and second intermediate coolant circulating systems to allow coolant, in the second operation configuration, to flow between the supply lines of the first and second intermediate coolant circulating systems and a further return line (21a) interconnectable between the return lines of the first and second intermediate coolant circulating systems to allow coolant, in the second operation configuration, to flow between the return lines of the first and second intermediate coolant circulating systems.

6. The cooling system of claim 2, wherein,
the first intermediate coolant circulating system comprises a coolant tank (13c), from which the pump of the first intermediate coolant circulating system is configured to pump coolant in the first operation configuration;
the second intermediate coolant circulating system comprises a coolant tank (14c), from which the pump of the second intermediate coolant circulating system is configured to pump coolant in the first operation configuration; and
the line manifold comprises a further line (22a) interconnectable between the coolant tanks of the first and second intermediate coolant circulating systems to allow coolant to flow between the coolant tanks of the first and second intermediate coolant circulating systems in the second operation configuration.

7. The cooling system of claim 2, further comprising a coolant tank (28), wherein,
the first intermediate coolant circulating system comprises a first partition (28a) of said coolant tank (28), from which the pump of the first intermediate coolant circulating system is configured to pump coolant in the first operation configuration; and
the second intermediate coolant circulating system comprises a second partition (28b) of said coolant tank (28), from which the pump of the second intermediate coolant circulating system is configured to pump coolant in the first operation configuration, wherein
the coolant tank comprises a removable wall (28c), which separates the first and second partitions to prevent coolant from flowing between the first and second partitions of the coolant tank in the first operation configuration, and which is arranged to be removed to allow coolant to flow between the first and second partitions of the coolant tank in the second operation configuration.

8. The cooling system of claim 7, wherein the cooling system comprises a control arrangement (26) operatively connected to the removable wall and configured to control the removable wall to move when reconfiguring the cooling system.

9. The cooling system of claim 1, wherein, in the second operation configuration, the line manifold is connected such that the mixed coolants of the first and second intermediate coolant circulating systems are in heat exchange connection with the milk to be cooled only in the fourth heat exchange section (18), thereby allowing the flow of milk to be pre-cooled by tap water in the third heat exchange section (17).

10. The cooling system of claim 1, wherein,
the line manifold comprises a bypass line interconnectable between the return line of the second intermediate coolant circulating system and the supply line of the first intermediate coolant circulating system; and
in the second operation configuration, the line manifold is connected such that the mixed coolants of the first and second intermediate coolant circulating systems are in heat exchange connection with the milk to be cooled in the fourth heat exchange section, are passed through the bypass line, and are thereafter in heat exchange connection with the milk to be cooled first in the third heat exchange section.

11. The cooling system of claim 1, wherein, the first and second intermediate coolant circulating systems comprises fittings allowing the line manifold to be connected to, and disconnected from, the first and second intermediate coolant circulating systems when the cooling system is reconfigured.

12. The cooling system of claim 1, wherein, the line manifold is interconnected between the first and second intermediate coolant circulating systems by valves (20b-c, 21b-c, 22b-c; 20b-c, 21b-c, 22d-f), allowing coolant to pass between the first and second intermediate coolant circulating systems by valves depending on the position of the valves.

13. The cooling system of claim 12, wherein the valves are controllable valves and the cooling system comprises a control arrangement (26) operatively connected to the controllable valves and configured to control the controllable valves when the cooling system is reconfigured.

14. The cooling system of claim 1, further comprising a control arrangement (26) configured to control the cooling powers of the first and second refrigeration systems when the cooling system is reconfigured.

15. A milk storage facility comprising a milk tank (31) for storing milk, a milk line (19) connected to the milk tank, a milk pump (33) for pumping milk through the milk line and into the milk tank, and the cooling system of claim 1, wherein the third and fourth heat exchange sections are connected in the milk line.

16. The milk storage facility of claim 15 wherein the milk line is connected to a milking system (35), via a buffer reservoir (36) and a milk supply line (34).

17. A milking system comprising the cooling system of claim 1.

18. A method for reconfiguring a cooling system (10) for cooling a flow of milk comprising a first refrigeration system (11) and a second refrigeration system (12) having individually controllable cooling powers; a first heat exchange section (15), a second heat exchange section (16), a third heat exchange section (17), and a fourth heat exchange section (18); a first intermediate coolant circulating system (13) and a second intermediate coolant circulating system (14); and a line manifold interconnectable between the first and second intermediate coolant circulating systems, wherein coolant in the first intermediate coolant circulating system is in heat exchange connection with the first refrigeration system in the first heat exchange section (15) and coolant in the second intermediate coolant circulating system is in heat exchange connection with the second refrigeration system in the second heat exchange section (16), said method comprising the step of reconfiguring the cooling system between (i) a first operation configuration wherein coolant in the first intermediate coolant circulating system is in heat exchange connection with a flow of milk to be cooled in the third heat exchange section (17) and coolant in the second intermediate coolant circulating system is in heat exchange connection with the flow of milk to be cooled in the fourth heat exchange section (18) arranged downstream of the third heat exchange section with respect to the milk flow, thereby providing two-stage cooling of the flow of milk, and (ii) a second operation configuration wherein the line manifold is interconnected between the first and second intermediate coolant circulating systems to mix coolant of the first intermediate coolant circulating system with coolant of the second intermediate coolant circulating system, such that the mixed coolants of the first and second intermediate coolant circulating systems are in heat exchange connection with the milk to be cooled in the third (17) and fourth (18) heat exchange section or only in the fourth heat exchange section (18), thereby providing one-stage cooling of the flow of milk.

19. The method system of claim 18, wherein coolant is pumped by a first pump (13*b*) in the first intermediate coolant circulating system in the first operation configuration; and coolant is pumped by a second pump (14*b*) in the second intermediate coolant circulating system in the first operation configuration.

20. The method of claim 19, wherein coolant is pumped by only one of the first and second pumps in the second operation configuration.

\* \* \* \* \*